United States Patent [19]

Juergensen

[11] Patent Number: 4,473,848
[45] Date of Patent: Sep. 25, 1984

[54] LIGHT PICK-UP DEVICE

[75] Inventor: Heinrich Juergensen, Raisdorf, Fed. Rep. of Germany

[73] Assignee: Dr. Ing. Rudolf Hell GmbH, Fed. Rep. of Germany

[21] Appl. No.: 375,006

[22] Filed: May 5, 1982

[30] Foreign Application Priority Data

May 9, 1981 [DE] Fed. Rep. of Germany ....... 3118458

[51] Int. Cl.$^3$ ............................................ H04N 1/024
[52] U.S. Cl. ...................................... 358/294; 358/75;
358/901; 250/227; 250/228
[58] Field of Search ................. 358/901, 294, 75, 289,
358/293; 250/200, 216, 570, 227, 228; 355/1;
356/446, 213; 350/96.1

[56] References Cited

U.S. PATENT DOCUMENTS

| 1,970,312 | 8/1934 | Ives | 358/294 |
|---|---|---|---|
| 3,566,119 | 2/1971 | Lewis | 250/353 |
| 3,581,102 | 5/1971 | Nagao | 250/227 |
| 3,603,730 | 9/1971 | Weigi et al. | 358/294 |
| 3,882,270 | 5/1975 | Ogawa | 358/260 |
| 4,080,634 | 3/1978 | Schrieber | 358/298 |
| 4,177,487 | 12/1979 | Takenouchi et al. | 358/294 |
| 4,259,948 | 4/1981 | Urban | 128/6 |

FOREIGN PATENT DOCUMENTS

| 1900635 | 9/1969 | Fed. Rep. of Germany . |
|---|---|---|
| 2001099 | 3/1971 | Fed. Rep. of Germany . |
| 2328288 | 12/1973 | Fed. Rep. of Germany . |
| 2636368 | 2/1978 | Fed. Rep. of Germany . |
| 2850701 | 5/1979 | Fed. Rep. of Germany . |
| 1308047 | 2/1973 | United Kingdom . |

Primary Examiner—Howard W. Britton
Assistant Examiner—John K. Peng
Attorney, Agent, or Firm—Hill, Van Santen, Steadman & Simpson

[57] ABSTRACT

A light pick-up device for transparency and/or opaque scanning in either a drum or flat bed scanning device consists of a hollow body, which exhibits a light entry opening for the modulated light coming from the master. The inside surface of the hollow body, which is designed as a light pick-up surface for the opto-electronic conversion of the scanning light into an image signal, consists of a multitude of sub-surfaces, whose surface normals are oriented in the direction of the incoming scanning light. The sub-surfaces are the light surfaces of either opto-electronic transducers or are the end faces of optical fibers whose other end faces are coupled to an opto-electronic transducer. Because the disruptive influence of scratches and shadow edges in the master is suppressed, a high efficiency and a good uniformity of the scanning are achieved with the light pick-up device.

17 Claims, 7 Drawing Figures

U.S. Patent   Sep. 25, 1984   Sheet 1 of 3   4,473,848
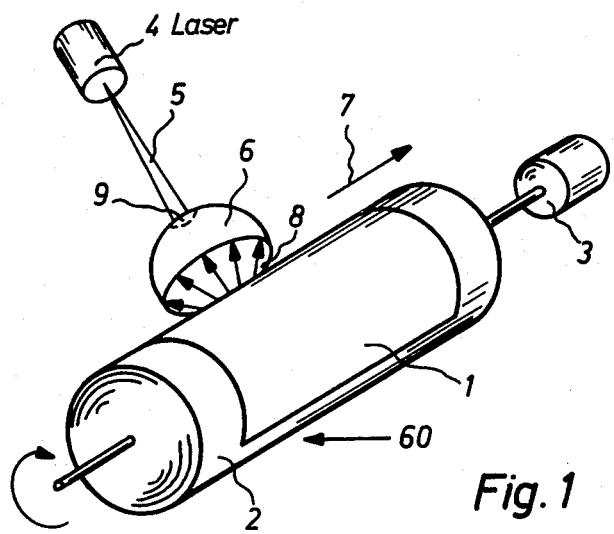
Fig. 1
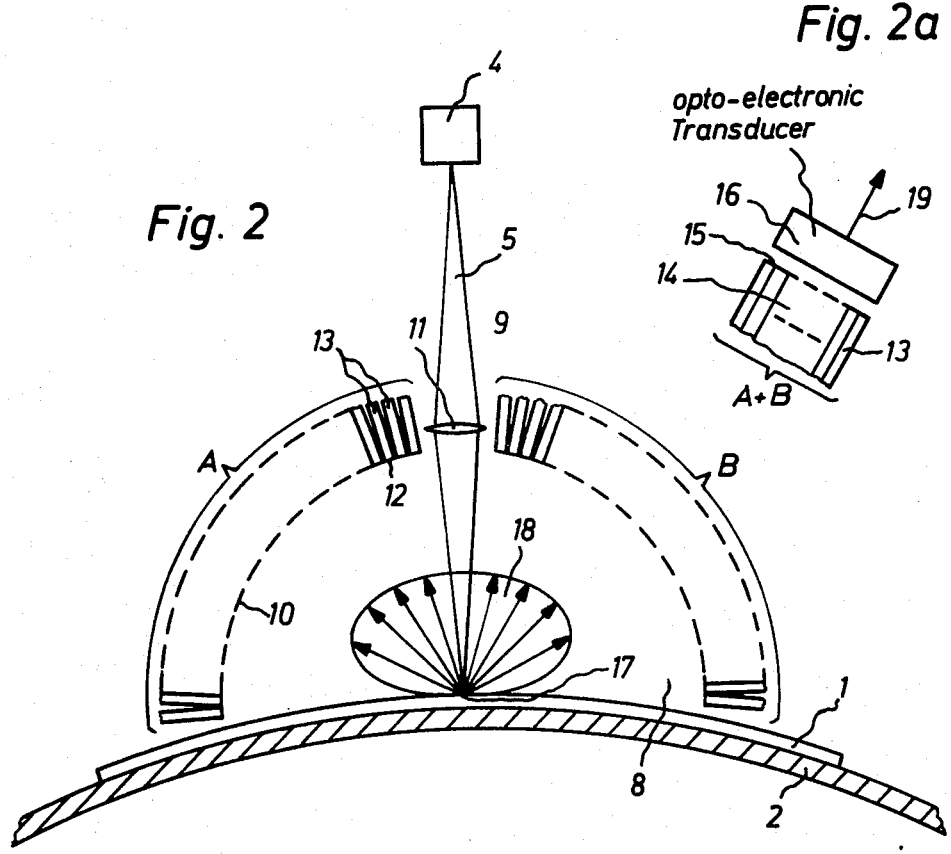
Fig. 2
Fig. 2a

LIGHT PICK-UP DEVICE

BACKGROUND OF THE INVENTION

1. Field of the Invention

The invention relates to a light pick-up device of an opto-electronic scanning element for transparency and opaque masters in either a flat bed or a drum scanning device.

2. Prior Art

Flat bed or drum scanning devices are employed, for example, in facsimile transmission technology. A light beam scans a master or original, which is to be reproduced point-by-point and line-by-line. The scanning light, which is modulated by the master, is directed upon an opto-electronic scanning element, which converts it into an image signal. The image signal is transmitted over a transmission channel to a facsimile recording device, which records a reproduction of the master or original.

The masters to be reproduced may be type masters, rastered or unrastered image masters, or masters, which are assembled of type and images and are so-called paste-up montages.

Traditional opto-electronic scanning elements essentially consist of at least one light source, which provides a punctiform illumination of the master, a lens, an opto-electronic transducer for generating the image signal from a modulated light received from the master, and a diaphragm disposed between the lens and transducer. Whereas the light source produces a relatively large illumination spot on the master, the diaphragm aperture determines the size of the actual, smaller scanning spot and the scanning fineness or resolution as well, because the scanning spot on the master is sharply imaged in the diaphragm by means of the lens. For the purpose of a sharp imaging of the scanning spot, even in case of thickness fluctuation of the masters, which may occur with either paste-up montages, or with non-uniform color application, etc., the lens must have a great depth of field since a readjustment of the focus of the spot during the scanning is involved. However, a great depth of field for the lens can in turn only be achieved with a small aperture angle for the lens.

Masters will modulate the scanning light by diffusely reflecting it at a large solid angle. With scratches in the master and with so-called shadow edges in the case of the paste-up montages, the intensity distribution of the modulated light, which is reflected back by the master, is asymmetrical within the solid angle. This asymmetrical intensity distribution causes scanning errors in the case of a nearly punctiform brightness measurement. In order to reduce such scanning errors, the modulated light must be collected, i.e., the scanning element must pick up the asymmetrically modulated light over a solid angle which is as great as possible, and a large aperture angle of the lens is required for this purpose.

Thus, in a traditional scanning element with diaphragm and lens, a demand for a great depth of field at a small aperture angle is opposed by a demand for a large aperture angle in order to reduce these scanning errors. Therefore, a compromise must be made between these two demands and this is viewed as a considerable disadvantage.

In order to reduce the scanning errors, light pick-up devices in the form of hollow bodies are known from the U.S. Pat. Nos. 4,080,634 and 3,603,730 in which the modulated light coming from the master is collected and supplied to light-sensitive surfaces and the disclosures of these two patents are incorporated by reference thereto. In the case of the device in U.S. Pat. No. 4,080,634, the light-sensitive surface is a photodiode strip, and, in the case of the U.S. Pat. No. 3,603,730, the entire inside surface of the hollow body is designed as a light-sensitive surface.

These known light pick-up devices have the disadvantages that the light-sensitive surfaces (photodiodes) are relatively insensitive and slow, and as a result, the device can achieve only a low scanning rate. A higher scanning rate could be achieved, for example, by employing fast photomultipliers. Given the known light pick-up devices, the disposition of a multitude of such photomultipliers instead of the light-sensitive surface would be too involved or, would hardly be possible for reasons of space requirements. A further disadvantage of the known light pick-up device is that they are only suitable for scanning opaque masters in a flat bed scanning device and are not suitable either for transparency masters or for drum scanning devices.

SUMMARY OF THE INVENTION

In order to avoid these disadvantages, it is therefore the object of the present invention to provide a light pick-up device for either transparency and/or opaque scanning, and which device may be used in a drum scanning device. The device of the present invention also has a high scanning rate and, at the same time, achieves a high sensitivity and uniformity of the scanning.

To accomplish these objects, the present invention is directed to an improvement in a light pick-up device for point-by-point and line-by-line opto-electronic scanning of an original or a master. The device includes means for projecting a scanning light beam on the master, which modulates the beam to form modulated light, and means for sensing the modulated light including a hollow body with a light entrance opening facing the master for receiving the modulated light, said hollow body having an inside surface designed as a light pick-up surface to pick up the modulated light from a large solid angle. The improvements comprises the light pick-up surface being formed by a plurality of either surfaces of opto-electronic transducers or end faces of optical fibers, said surfaces or end faces being positioned to extend substantially perpendicular to the incoming modulated light and each of the optical fibers having its other end face coupled to an opto-electronic transducer for converting the light received by the fibers into image signals.

The master or original may be either transparent or opaque and can be either supported on a planar carrier of a flat bed scanning device or a rotating drum shaped carrier of a drum scanning device which carriers may also be transparent. The hollow body in a plane extending perpendicular to the master has a semi-circular cross-section whose center is approximately at the point of incidence of the scanning light beam. If the carrier is planar, the hollow body has a semi-cylindrical shape and if the carrier is a drum, the body has a semi-spherical shape. If the master is opaque, the hollow body has a second opening so that the means for projecting can direct the scanning light beams through the second opening and onto the master. The second opening is an elongated slot when the pick-up device is used in a flat bed scanning device.

The pick-up device can include means for color separations, which comprises separating the fibers into three bundles which has a separate opto-electronic transducer and a dichroitic filter. The fibers of the bundles are selected so that at a given point, the three adjacent end faces are of fibers in the different bundles.

BRIEF DESCRIPTION OF THE DRAWINGS

FIG. 1 is a perspective view of a drum scanning device with a light pick-up device for opaque scanning in accordance with the present invention;

FIG. 2 is a cross-sectional view with portions in elevation of a light pick-up device of FIG. 1;

FIG. 2a is a view of the portion of an opto-electronic transducer and an end surface of a bundle of fibers of the device of FIG. 2;

FIG. 6 is a cross-sectional view similar to FIG. 2 with portions in elevation of an embodiment of the light pick-up device utilizing a plurality of opto-electronic transducers.

DESCRIPTION OF THE PREFERRED EMBODIMENTS

Figure 3:
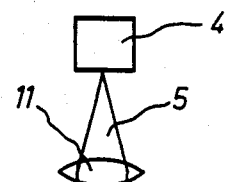
FIG. 3 is a cross-sectional view with portions in elevation of an embodiment of the light pick-up device for transparency scanning in a drum scanning device.

The principles of the present invention are particularly useful when incorporated into a drum scanning device generally indicated at 60 which device has a light pick-up device for opaque scanning.

In the device 60, an opaque master 1, which is to be reproduced, is attached to a scanning drum 2, which is driven by a motor 3. A light source 4, which for example, is a laser light generator, which generates a scanning light beam 5, and a light pick-up device 6 of an opto-electronic scanning element are moved axially along the scanning drum 2 in the same direction, which is indicated by an arrow 7. The light pick-up device 6 has the approximate shape of a hollow hemisphere, whose opening faces the opaque master 1 and forms a first light passage or entry opening 8. At that side facing away from the opaque master 1, the light pick-up device 6 exhibits a smaller second entry opening 9. The inside surface of the light pick-up device 6 is designed as a light pick-up surface. The scanning light beam 5 from the light source 4 is projected upon the opaque master 1 through the second light entry opening 9 and through the light passage opening 8. The scanning light beam is modulated with the image content of the original or opaque master 1 and is reflected back into the light pick-up device 6 through the light passage opening 8. This reflected modulated light is picked up by the light pick-up surface and is converted into an image signal by means of an opto-electronic transducer which is not illustrated in FIG. 1.

The structure of the light pick-up device 6 for opaque masters is illustrated in FIG. 2. The device 6 has the second light entry opening 9 and the first light passage opening 8 and is a cross-sectional view which is perpendicular to the axis of the scanning drum 2.

A lens 11, which is preferably a zoom lens, is disposed in the light entry opening 9. The light entry opening 9 is kept of such size that unmodulated scanning light, which is reflected back from a shiny surface of the master will immediately exit from the light pick-up device 6 through the opening 9 and remains out of consideration. The gap between the rotating surface of the scanning drum 2 and the light pick-up device 6 is selected to be such a width that, in particular, the thicker paste-up montages can pass unimpeded under the device 6.

The light pick-up surface 10 consists of a multitude of sub-surfaces. In the sample embodiment, the sub-surfaces are the end faces 12 of optical fibers 13 which are not illustrated in detail in the Figure nor are they illustrated with their full length. The optical fibers 13 are disposed in such manner that their end faces 12 approximately represent tangential surfaces of the hollow-half sphere of the surface 10. All optical fibers 13, symbolized by the brackets "A" and "B" are combined into an optical fiber bundle 14 (A+B) of FIG. 2a so that the other end faces act together to form a light exit surface 15 for the modulated light. An opto-electronic transducer 16, for example, a fast photomultiplier, is optically coupled to the light exit surface 15. Alternatively thereto, the sub-surfaces can also be the light entry surfaces 51 (see FIG. 6) of a plurality of individual opto-electronic transducers 52 which are arranged semicircularly. Each transducer 52 has a pair of leads 53 and the transducers are in two groups A and B. The leads 53 of the transducer 52 in both groups are connected in parallel to create an image signal.

The scanning light beam 5, which is generated in the light source 4, is focused by the lens 11 into a scanning spot 17 on the opaque master 1. The scanning drum 2, which supports the master 1, and the light pick-up device 6 are positioned relative to one another in such a manner that the scanning spot 17 is the center of the hollow sphere which is formed by the surface 10. The light 18, which is modulated with the image content of the momentary scanning spot 17, may have an asymmetrical intensity distribution due to scratches or surface irregularities in a paste-up montages and is diffusely reflected by the opaque master 1 into the light pick-up device 6. The light pick-up surface 10 of the light pick-up device 6 collects the modulated light 18 at a large aperture angle and conducts it to the opto-electronic transducer 16 which generates the image signal on a line 19. The aperture angle defines the solid angle at which the light pick-up device can pick up absolutely no light.

The inventive light pick-up device exhibits, in particular, the following advantages. The light pick-up device picks up a large proportion of the modulated light 18 coming from the master over a large aperture angle, so that a high efficiency is created and the disruptive influences of scratches and shadow edges are significantly reduced in an advantageous manner. On the other hand, a great depth of field is achieved in the scanning plane since, independently of the aperture angle, a narrow scanning light beam 5 is produced by means of the lens 11. As a result of the high efficiency, the light source 4 can be operated at a lower power. Since a multitude of optical fibers 13 participate in the light transport to the opto-electronic transducer 16, unequal transmission properties of the individual optical fibers 13 are eliminated in an advantageous manner and a high uniformity of the scanning is achieved. Since the size of the scanning spot 17 is not fixed by the aperture of a diaphragm but, rather, is fixed by the corresponding focusing of the light beam 5, no light loss occurs as a result of the diaphragm and the light source 4 can be more efficiently exploited.

FIG. 3 shows a further sample embodiment of a light pick-up device 6' for transparency scanning in a drum scanning device and is a cross-sectional view on a plane perpendicular to the axis of a transparent drum 2'.

Figure 3A:
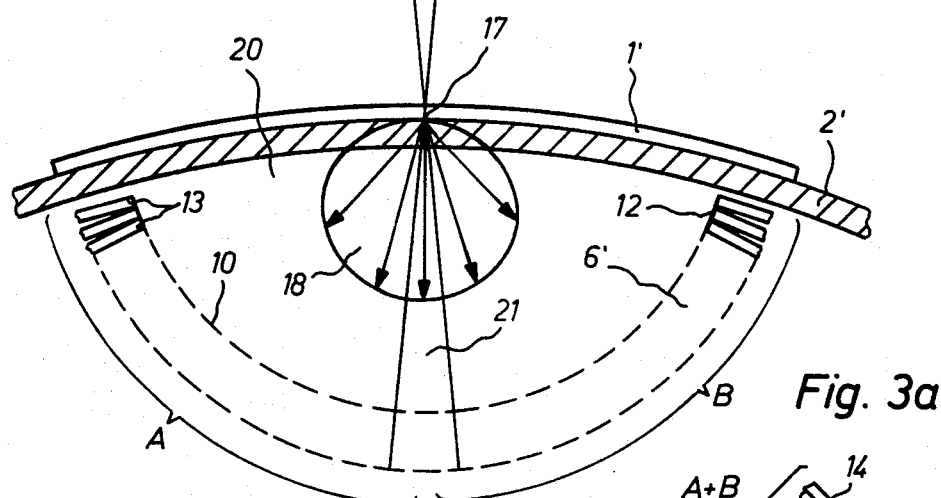
FIG. 3a is a view of the position of the transducer and the end surface of the bundle of fibers of the device of FIG. 3.

A transparency master 1' is situated on the transparent scanning drum 2'. A modified light pick-up device 6' is disposed within the scanning drum 2' and the light pick-up device 6' exhibits a light entry opening 20 only at its side facing the transparency master 1' and is modulated there with the image content of the scanning spot 17 to form a modulated light 18 and the light bundle 21 is again transported by the optical fibers 13 to the opto-electronic transducer 16 (FIG. 3a) and is converted into an image signal there.

The light entry opening 20 can be covered with either a glass plate or a diffusing screen. The opening 20 can also be covered with a combination consisting of a glass plate and diffusing screen or, respectively, scattering lens, which is in the optical axis of the scanning light beam 5. The plates, screens or combination protect the inside space against the incursion of dust. Diffusing screen or scattering lens have, in particular, the additional advantage that they expand the light beam 21 at the same time. As a result, a greater number of optical fibers 13 participates in the transport of the modulated light to the opto-electronic transduer 16. On the one hand, a greater uniformity of the scanning is achieved, and, on the other hand, the light pick-up device 6' is made less sensitive to dust particles situated in its inside space.

In a drum scanning device 60 for optional opaque and transparency scanning, the light pick-up devices 6 and 6' are preferably interchangeable. Thus, depending on the type of master, the light pick-up device according to FIGS. 2 and 3 is situated either outside the drum (FIG. 2) or within the scanning drum 2' (FIG. 3). Thus, the light entry opening 9 of the device 6 of FIG. 2 is designed so as to be closable by means of a suitable means in case the device 6 is to be used for a transparency scanning.

Alternatively, the scanning device can also be equipped with a respective light pick-up device for opaque scanning and one for transparency scanning which are selectively activated depending upon the type of master. In transparency scanning, the presence of two light pick-up devices has an additional advantage that both light pick-up devices can be optically or electrically connection in parallel for the purpose of eliminating image signal disruptions due to dust particles, scratches, and etc. In the case of an optical parallel connection, the light exit surfaces of both light pick-up devices are coupled to an opto-electronic transducer, and in the case of an electrical parallel connection, the outputs of the opto-electronic transducers are combined.

Figure 4:
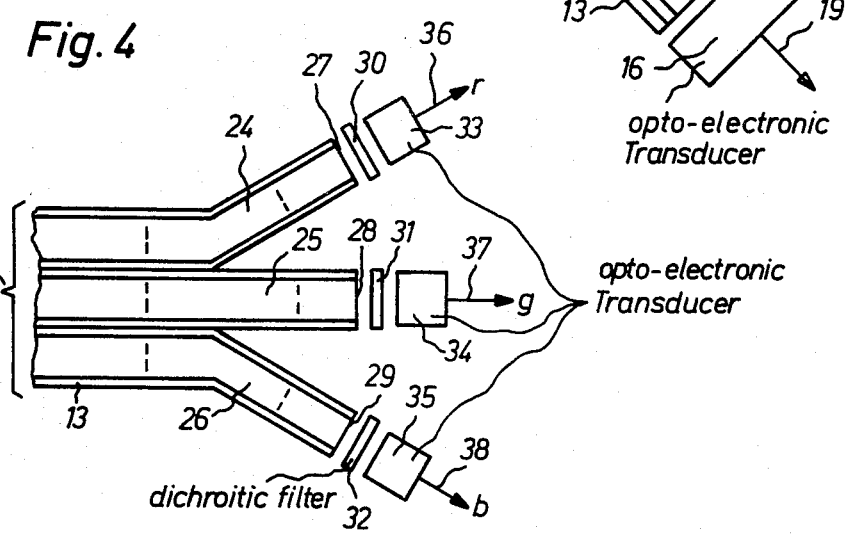
FIG. 4 is a view similar to FIGS. 2a and 3a of a light pick-up device for color scanning.

An advantageous development or embodiment of the inventive light pick-up devices in scanning devices for colored masters is partially shown in FIG. 4. The optical fiber bundle 14 which extends toward the opto-electronic transducers 16 is split into at least three individual bundles 24, 25 and 26, and the fiber optical end faces of each individual bundle respectively form a separate light exit surface 27, 28 and 29. The division of the fiber optical bundle 14 is accomplished in such manner that a respective triplet of optical fibers 13, whose end faces 12 are closely adjacent in the light pick-up surface 10, is selected and each optical fiber 13 of a triplet is allocated to an individual bundle 24, 25 and 26.

For the purpose of the color separation of the scanning light, the three light exit surfaces 27, 28 and 29 are coupled through three dichroitic filters 30, 31 and 32 to three opto-electronic transducers 33, 34 and 35 which will create the three measured color value signals, r, g and b on the lines 36, 37 and 38.

Figure 5:
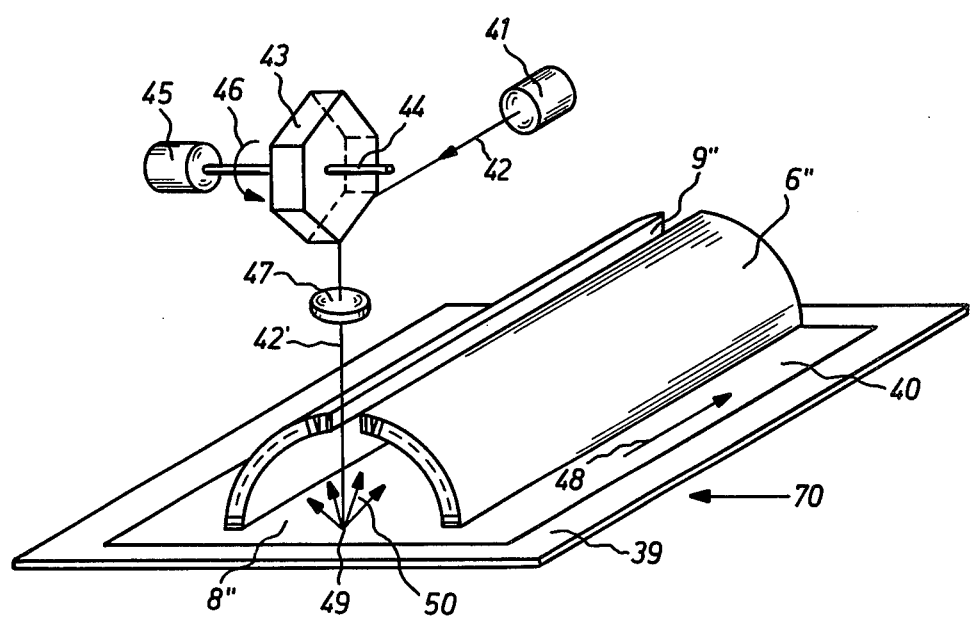
FIG. 5 is a perspective view of a sample embodiment of a light pick-up device of the present invention for opaque scanning in a flat bed scanning device.

The discussion hereinabove was directed to a light pick-up device for drum scanning devices. The inventive light pick-up device, however, can also be employed in a flat bed scanning device generally indicated at 70 in FIG. 5, which device is for opaque scanning. In this embodiment, a light pick-up device 6" is designed as one half of a hollow cylinder with a cross-section according to FIG. 2.

An opaque master 40, which is to be reproduced, is situated on a movable flat bed master holder or carrier 39. A light source 41, for example, a laser light generator, generates a light beam 42, which is directed upon a polyhedral mirror 43 which rotates on an axis of rotation 44. The rotating or revolving polyhedral mirror 43 is aligned perpendicularly relative to the optical axis of the light beam 42. A motor 45 rotates the polyhedral mirror 43 with a constant angular velocity in the direction of an arrow 46. As a result of the rotation of the polyhedral mirror 43, the light beam 42 proceeding from the light source 41 is reflected by the individual mirror surfaces through a lens 47 and is continuously deflected in the line direction 48 (scanning direction) onto the opaque master 40. At the same time, the flat bed master holder 39 executes a step-by-step or continuous forward feed motion, which is perpendicular to the line direction 48, so that the opaque master 40 is scanned point-by-point in lines lying next to one another.

The stationary light pick-up device 6", which extends in the line direction 48 at least over the length of the flat bed master holder 39, is disposed above the movable flat bed master holder 39. The device 6" has a light entry opening 9", which has a form of a slot, and a light passage opening 8" is formed by the open side of the hollow half cylinder forming the device 6".

The light beam 42', which is deflected by means of the polyhedral mirror 43, is projected by lens 47 through the slot-shaped light entry opening 9" and the light passage opening 8" on to the master 40 as a scanning spot 49. The opaque master 40 with the image content at the scanning spot 49 will modulate the light and the modulated light 50 is reflected by the opaque master 40, is collected by the light pick-up device 6" and, as already described, is further processed.

The light pick-up device 6", which is described above for flat bed scanning devices 70, can, of course, also be employed in modified form for transparency scanning, as was explained in the case of a drum scanning device.

In a development of the light pick-up device for flat bed scanning devices, the fiber optical bundle 14 according to FIG. 2a can be arranged in such manner that the optical fibers 13(A) whose end faces 12 lie to the left of the optical axis of the light beam 5 (FIG. 2) and the optical fibers 13 (B) whose end faces 12 lie to the right of the optical axis are respectively combined into individual bundles. Thus, the optical fiber end faces of each individual bundle form a separate light exit surface.

The separate light exit surfaces can then be optically connected in parallel by being connected in common to an opto-electronic transducer. Alternatively, however, each light exit surface of the two bundles can also have a separate opto-electronic transducer allocated to it. Image signal disruptions due to dust particles or scratches in the master can be eliminated in an advantageous manner with either embodiments.

Although various minor modifications may be suggested by those versed in the art, it should be understood that I wish to embody within the scope of the patent granted hereon, all such modifications as reasonably and properly come within the scope of my contribution to the art.

I claim:

1. In a light pick-up device for point-by-point and line-by-line opto-electronic scanning of a master, said device having means for projecting a scanning light beam on the master, which modulates the beam to form modulated light, and means for sensing the modulated light including a hollow body with a light entrance opening facing the master for receiving the modulated light, said hollow body having an inside surface designed as a light pick-up surface to pick up the modulated light from a solid angle, the improvements comprising the light pick-up surface being formed by a plurality of end faces of optical fibers, said end faces being positioned to extend substantially perpendicular to the incoming modulated light and each of the optical fibers having its other end face coupled to an opto-electronic transducer for converting the light received by the fibers into image signals.

2. In a light pick-up device according to claim 1, wherein the master is a transparent master, said hollow body being positioned with its opening to receive modulated light passing through the transparent master.

3. In a light pick-up device according to claim 2, wherein the hollow body in a plane extending perpendicular to the master has a cross-section of a semi-circular configuration with the center lying approximately at the point of incidence of a scanning light beam on the master and wherein each of the end faces forming the pick-up surface are tangent surfaces.

4. In a light pick-up device according to claim 2, wherein the master is supported on a transparent drum-shape carrier, said hollow body having an inner hollow semi-spherical surface, with the end faces of the fibers being tangent to said hollow surface, and said body being positioned in the interior of the transparent scanning drum with the opening facing the master.

5. In a light pick-up device according to claim 2, wherein the transparent master is disposed on a transparent planar carrier of a flat bed scanning device, said hollow body having a semi-cylindrical shape with the inside surface being half of a hollow cylinder extending along the length of the line being scanned, said semi-cylindrical shaped hollow body being positioned on an opposite side of the planar carrier from the means for projecting a scanning light beam.

6. In a light pick-up device according to claim 2, wherein the light entry opening of the hollow body is closed with a transparent glass plate.

7. In a light pick-up device according to claim 2, wherein the light entry opening of the hollow body is closed with a scattering medium.

8. In a light pick-up device according to claim 2, which includes means for color separation of the modulated light including said optical fibers extending into three bundles of fibers with an opto-electronic transducer associated with each bundle and a dichroitic filter being disposed between the other end of each bundle and its transducer so that a color separation is accomplished.

9. In a light pick-up device according to claim 1, which includes means for obtaining a color separation of the modulated light, said means including placing the optical fibers into three distinct bundles with each bundle terminating in a separate opto-electronic transducer having a dichroitic filter arranged therewith.

10. In a light pick-up device according to claim 1, wherein the master is an opaque master, said hollow body having a second light entrance opening opposite the first mentioned opening, said means for projecting a scanning light beam directs the light beam through said second opening onto said master which modulates the light by diffusedly reflecting the light.

11. In a light pick-up device according to claim 10, wherein the second light entry opening can be closed to enable utilizing the hollow body for scanning a transparent master.

12. In a light pick-up device according to claim 10, wherein the light pick-up surface of the hollow body in a plane extending perpendicular to the master has a semi-circular configuration with the center of the circle approximately being at the point of incidence of the scanning light beam on the master and each of the end faces of the fibers being tangential surfaces.

13. In a light pick-up device according to claim 10, wherein the master is disposed on a rotating drum-shaped carrier of a drum scanning device and said hollow body having an inner surface of a hollow hemisphere.

14. In a light pick-up device according to claim 10, wherein the master is disposed on a planar carrier of a flat bed scanning device and said light pick-up surface is one half of a hollow cylindrical surface extending over at least the length of the line length being scanned and said second opening being an elongated slot having at least the length of said line length.

15. In a light pick-up device according to claim 10, wherein the second light entry opening of the hollow body has a size so that light of the light beam, that is mirror reflected by the master, emerges out of the hollow body by passing through said second opening.

16. In a light pick-up device according to claim 10, which includes means for color separation of the reflected light, said means comprising the optical fibers being separated into three distinct group, each group of the optical fiber having a separate opto-electronic transducer and a dichroictic filter being disposed between the other end faces and the opto-electronic transducer associated therewith.

17. In a light pick-up device for point-by-point and line-by-line opto-electronic scanning of a master, said device having means for projecting a scanning light beam on the master, which modulates the beam to form modulated light, and means for sensing the modulated light including a hollow body with a light entrance opening facing the master for receiving the modulated light, said hollow body having an inside surface designed as a light pick-up surface to pick up the modulated light from a solid angle, the improvements comprising the light pick-up surface being formed by a plurality of sub-surfaces of opto-electronic transducers, said sub-surfaces being positioned to extend substantially perpendicular to the incoming modulated light so that the modulated light received on each of the sub-surfaces is converted into image signals.

* * * * *